Figures 4, 5:
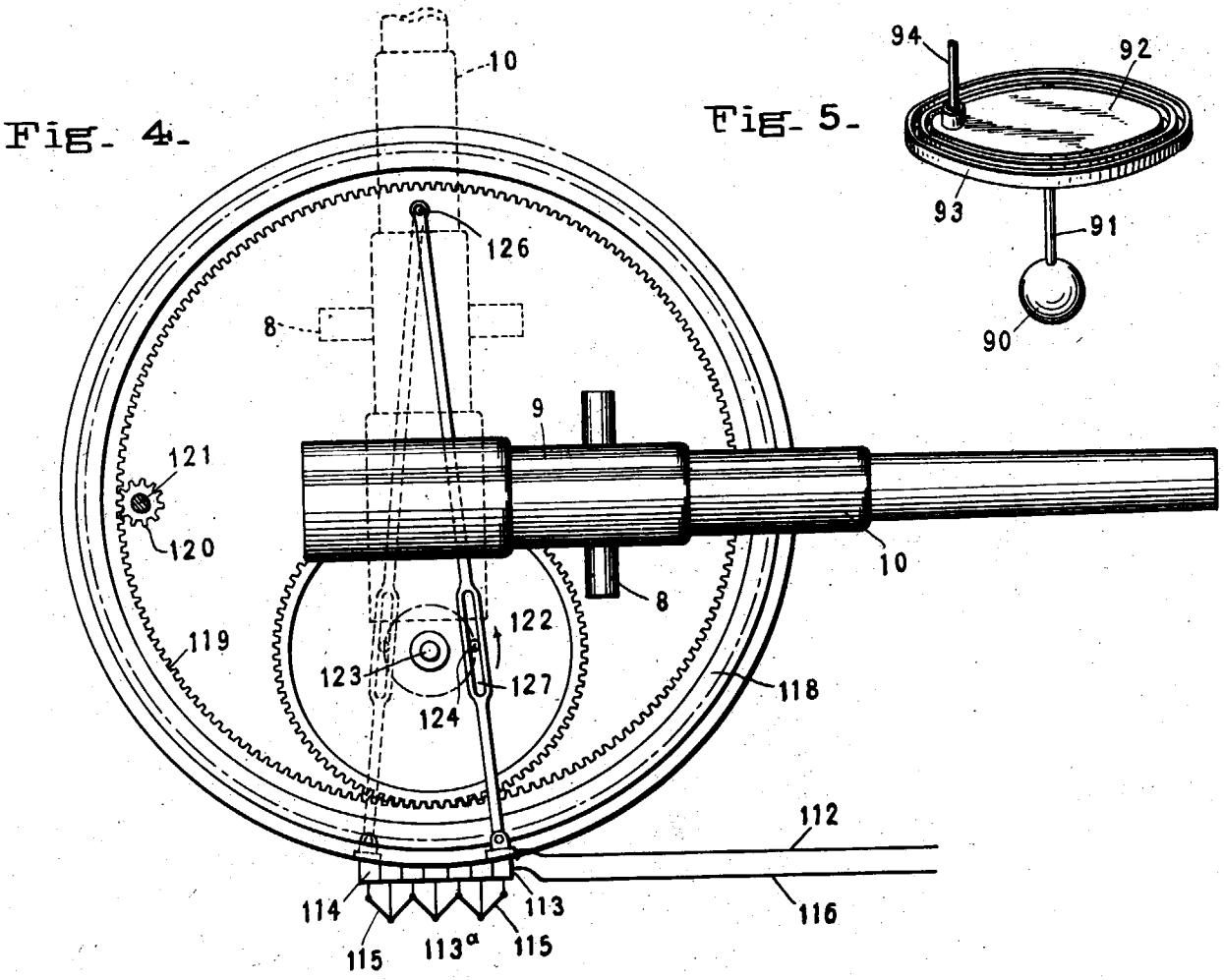

J. B. RYAN.
ELECTRICALLY OPERATED GUN CONTROL.
APPLICATION FILED JAN. 29, 1909.
Reissued Jan. 14, 1913.
13,514.
3 SHEETS—SHEET 1.
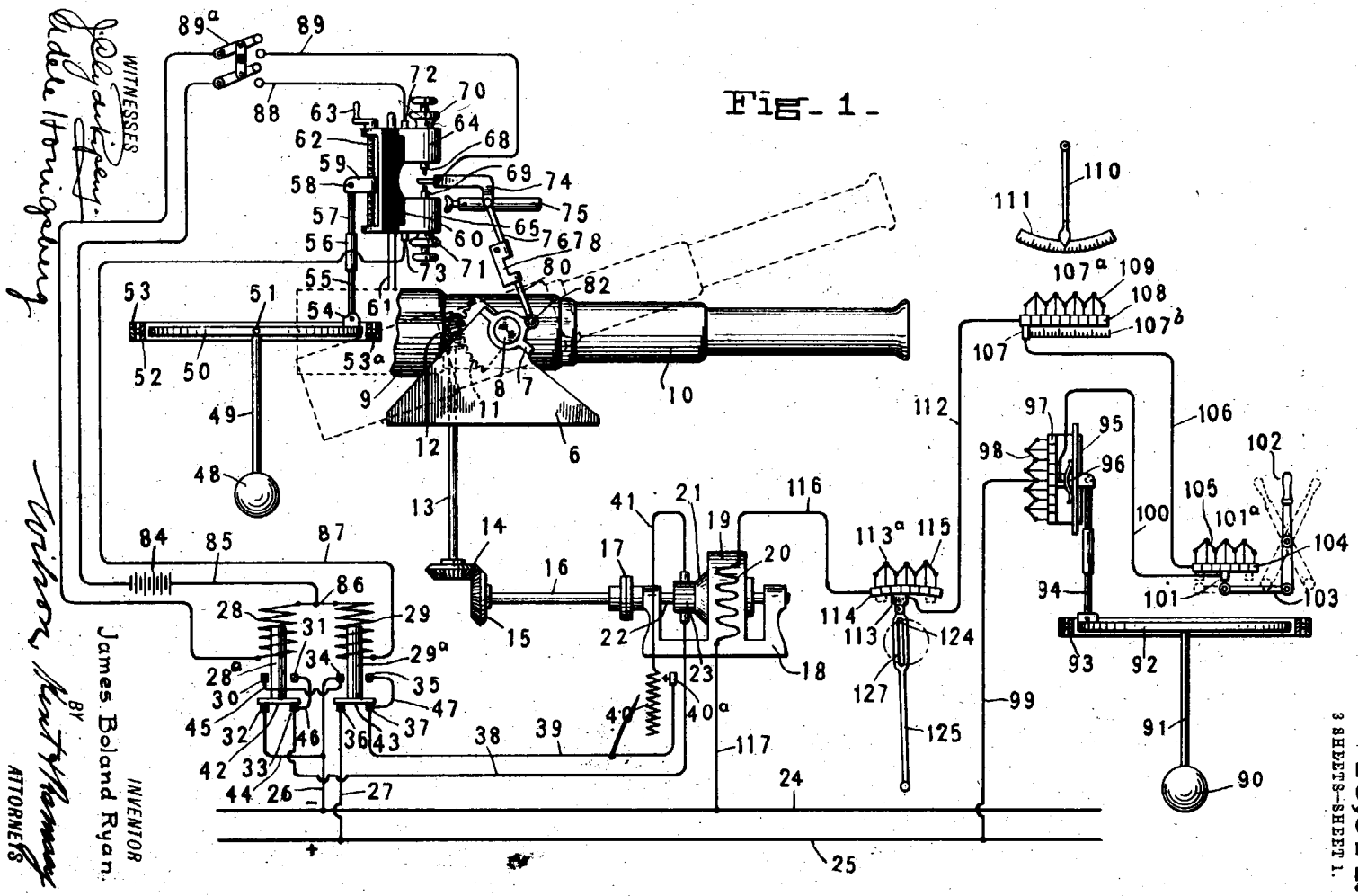

J. B. RYAN.
ELECTRICALLY OPERATED GUN CONTROL.
APPLICATION FILED JAN. 29, 1909.
Reissued Jan. 14, 1913.
13,514.
3 SHEETS—SHEET 2.
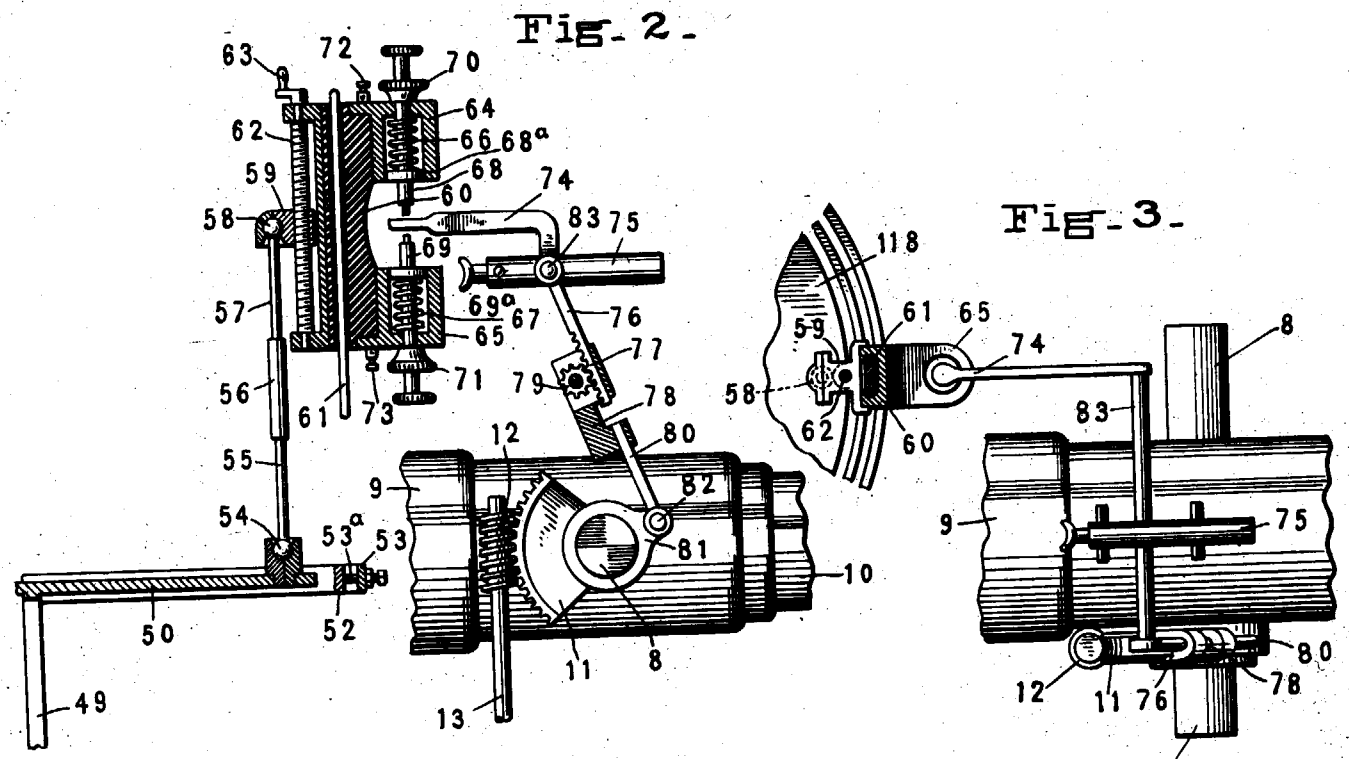
WITNESSES
Adele Honigsberg
J. Clyde Ripley.
INVENTOR
James Boland Ryan.
BY
Wilson, Kent & Ramsey
ATTORNEYS

J. B. RYAN.

ELECTRICALLY OPERATED GUN CONTROL.

APPLICATION FILED JAN. 29, 1909.

Reissued Jan. 14, 1913.

13,514.

3 SHEETS—SHEET 3.

WITNESSES

J. Clyde Kipley

Adele Honigsberg

INVENTOR

James Boland Ryan.

BY

Wilson, Kent & Ramsey

ATTORNEYS

UNITED STATES PATENT OFFICE.

JAMES BOLAND RYAN, OF HOBOKEN, NEW JERSEY, ASSIGNOR, BY MESNE ASSIGNMENTS, TO AUTOMATIC GUN CONTROL COMPANY, OF NEW YORK, N. Y., A CORPORATION OF NEW YORK.

ELECTRICALLY-OPERATED GUN CONTROL.

13,514. Specification of Reissued Letters Patent. Reissued Jan. 14, 1913.

Original No. 906,939, dated December 15, 1908, Serial No. 414,018. Application for reissue filed January 29, 1909. Serial No. 475,087.

*To all whom it may concern:*

Be it known that I, JAMES BOLAND RYAN, a citizen of the United States, residing at Hoboken, in the county of Hudson, State of New Jersey, have invented certain new and useful Improvements in Electrically-Operated Gun Controls, of which the following is a specification.

This invention relates to the art of training instruments and more particularly to the art of training instruments upon shipboard.

The prime object of the invention is to provide means whereby the instrument to be trained may be maintained in trained position despite the undesirable motions of its support.

The embodiment of the invention disclosed and to be described herein relates to gunnery and the particular object to be attained is to provide means whereby a gun may be kept trained upon a target notwithstanding motion of the vessel upon which the gun is mounted other than the motion of travel of said vessel.

My invention further relates to means whereby the size of the danger zone is greatly lessened, and the chances of striking the target correspondingly increased, in instances where it is impracticable to keep the piece trained at all moments upon the target.

My invention relates further to certain improvements in construction whereby the gun, or other piece of ordnance to be trained is controlled by a prime mover, such as an electric motor, the action of the prime mover being qualified by a number of independent factors entering into the composite motions of the ship carrying the piece.

My invention relates still further to certain details of construction relating generally to the control of the power of the electric current as used for actuating the motor used for training the piece of ordnance to be handled.

My invention is not limited to any exact form of mechanism, but for convenience and as representative of the general idea underlying the invention, I prefer to show it as applied to any ordinary high power gun which is operated by a variable, high speed, reversible electric motor.

Reference is to be had to the accompanying drawings forming a part of this specification, in which similar characters of reference indicate corresponding parts in all the figures.

Figure 1 is a fragmentary side elevation of the gun and the motor and gearing for handling the same so as to keep it properly sighted, this view further showing, in the lower left-hand corner, contacts operated by solenoids and used for reversing the direction of the rotation of the armature shaft of the motor, this view still further showing a pendulum and contact mechanism for controlling these solenoids, and also showing several rheostats operated in various ways for increasing and decreasing the current through the motor; Fig. 2 is a fragmentary side elevation of a portion of the gun and shows a sectional view of the contact mechanism controllable by the weight of the pendulum at the left of Fig. 1; Fig. 3 is a fragmentary view showing in plan a portion of the gun and its sighting mechanism and in section a portion of the contact mechanism and its accompanying parts; Fig. 4 is a plan view of the gun and of the turret in which it is mounted, this view further showing how the occasional partial rotation of the turret operates a rheostat to control the motor current accordingly; Fig. 5 is a perspective of the pendulum shown at the right of Fig. 1 and used for operating a rheostat, this pendulum being practically identical in construction with the one shown at the left of Fig. 1 and used in connection with a part of the contact mechanism.

The general purpose I seek to accomplish is to so move the gun relatively to the vessel as to compensate for undesirable and unavoidable motions of the ship, such as would ordinarily tend to render the aim of the gun more difficult.

In practice, under ordinary conditions, my invention accomplishes the objects stated, keeping the gun perfectly trained upon the target so that a large proportion of shots are likely to hit. Under extreme conditions it may be impracticable to keep the aim perfect, and in this event the gunner may find it necessary to assist the mechanism by moving the gun in the usual manner or in some other preferred way. In such event, the utility of my invention lies in the fact that in training the gun, less movement is required to bring it into desired position than would be the case in the absence of my improved mechanism.

A carriage is shown at 6 and is provided with bearings 7 engaged by trunnions 8 which are mounted upon a sleeve 9 carrying a gun 10. This arrangement is for the purpose of allowing the recoil of the gun to take place without disturbing the position of the carriage. A sector 11, having the form of a mutilated worm gear is engaged by a worm 12 mounted rigidly upon a revoluble shaft 13. This shaft is provided with a bevel gear 14 which meshes with another bevel gear 15 carried by a revoluble shaft 16. This shaft is provided with a coupling 17. At 18 is a variable speed reversible electric motor having a field 19 provided with a winding 20 and also having a high speed revoluble armature 21 mounted upon a shaft 22. This armature is provided with a commutator 23. The ship mains are shown at 24, 25, and wires 26, 27 are connected with these mains.

Two solenoids are shown at 28, 29, and are provided with movable cores 28ª, 29ª. The solenoid 28 is provided with stationary contact points 30, 31, 32, 33, the solenoid 29 being similarly provided with stationary contacts 34, 35, 36, 37. From the contact point 33 a wire 38 leads to the motor armature 21 and from the contact member 37 a wire 39 leads to a variable resistance 40, the latter being connected by a wire 41 with the armature 21.

The variable resistance 40 is controllable at will by a slide 40ª which is set and left alone. This variable resistance is for the purpose of adapting the apparatus, as a whole, for guns of different sizes, more resistance being necessary in instances where the gun is very light, and vice versa. The variable resistance is also necessary in order to give the apparatus for any given vessel a proper adjustment ascertainable by trial, as to current needed. The variable resistance is useful further in choking down extra currents due to sudden stoppage and reversal of the motor armature.

A contact plate 42 is mounted upon the movable core 28ª and is adapted to engage and disengage the stationary contact members 30, 31, 32, 33. Another contact plate 43 is similarly mounted upon the core 29ª and adapted to engage the contact members 34, 35, 36, 37. A wire 44 connects the stationary contact member 32 with the wire 27. A wire 45 connects together the stationary contact members 30, 34. A wire 46 connects together the contact members 31, 33, and the contact members 35, 37 are connected together by a wire 47.

A pendulum 48 is mounted upon a rod 49, the latter being suspended from a disk 50 mounted upon bearings 51. These bearings support the disk 50 upon a circle 52 which is similarly supported upon a circle 53 by aid of bearings 53ª. By aid of a ball joint 54 a rod 55 is connected with the disk 50. A turnbuckle 56 engages this rod and also, engages another rod 57. The rod 57 is provided with a ball head 58 which is engaged in a bracket 59. A slide is shown at 60, and extending directly through this slide is a post 61 relatively to which the slide is moved. An adjusting screw is shown at 62 and passes directly through the bracket 59. This adjusting screw is provided with a handle 63 whereby it may be turned by hand and whenever it is rotated, the bracket 59 moves up or down, as the case may be.

Mounted upon the slide 60 are boxes 64, 65 containing spiral springs 66, 67, and extending through the boxes are contact screws 68, 69 provided with milled nuts 70, 71 for securing them rigidly in position. The springs 66, 67 are connected with the contact screws 68, 69 by the aid of heads 68ª, 69ª, mounted upon these screws in such a manner that one or the other of the springs is compressed by a contact arm 74, disposed intermediate the contact screws (see Figs. 1 and 2). This not only protects the contact screws and the contact arm from injury, but compensates for movements of the gun incidental to its reloading. That is to say, when the gun is moving and not following the relative movements of the ship, any accidental pressure exerted by the contact arm 74 against either of the contact screws 68 or 69, can do no harm. It is always necessary that the current be cut off while the gun is being reloaded, in mounts where a gun is brought to loading position. A switch 89ª is provided in the solenoid circuit for this purpose.

Binding posts are shown at 72, 73 and are mounted upon the boxes 64, 65 which are of metal and insulated from each other. A sighting telescope is shown at 75, and a bar 76 is connected with this instrument and is provided with a rack 77 which passes into a connecting clamp 78. The latter is provided with a manually-operated pinion 79, which engages the rack 77 and is adapted to raise or lower the sighting telescope 75. The clamping bracket 78 is mounted upon a rod 80 which is connected at 82 with one of the trunnions 8 (see Fig. 2), the trunnion being provided with a pin 82 for this purpose. The shaft 76 is connected with a shaft 83 on which the contact arm 74 and the telescope 75 are mounted. When the sight is adjusted for changes in range, the contact arm is adjusted at the same time, it being connected with the sight. It is essential that the contact arm 74 move through the same distance at the point where it touches the contact pins 68, 69 as the boxes move on the slide. That is to say, for any degree roll of the ship the movement of the boxes on the slide must be such that if the contact arm 74 moved the same distance in the same direction the gun would be trained in such a manner that it would exactly compensate for that degree of roll.

The sighting telescope is operated by movements of the gun. When the muzzle of the latter is raised the front end of the telescope is raised, and when the muzzle of the gun is lowered the front end of the telescope is lowered. The purpose of the wheel 79 is to adjust the aggregate length of the rods 76, 80 and thereby bring the line of sight of the telescope into a predetermined position relatively to the longitudinal axis of the gun, so that when the telescope is on the target the gun is trained upon it.

A battery is shown at 84 and from it a wire 85 leads to a wire 86 which connects together the solenoids 28, 29. The solenoid 29 is connected by a wire 87 with the binding post 73, and the binding post 72 is connected by a wire 88 with the solenoid 28. Connected with the contact arm 74 is a wire 89 which leads to the battery 84. By thus using a battery current instead of the high potential current otherwise obtainable upon shipboard, excessive sparking is prevented.

A pendulum 90 (see lower right-hand corner of Fig. 1) is mounted upon a rod 91, the latter being supported by a disk 92 mounted upon circles 93, substantially as above described with reference to the pendulum 48 at the left of Fig. 1.

A rod 94 connects the disk 92 with a rheostat slide 96 mounted upon a rheostat 95. This rheostat is provided with a number of contact points 97, successively connected with a continuous winding 98. The center of the latter is connected by a wire 99 with the main 25. From the slide 96 a wire 100 leads to a slide 101 forming part of a rheostat 101[a]. This slide is operated by a handle 102 and a pitman 103. The rheostat is provided with contacts 104, the latter being connected with a winding 105. This rheostat is connected by a wire 106 with a slide 107 of another rheostat 107[a], the latter being provided with contacts 108 and with a winding 109, and being further provided with a graduated scale 107[b], which has the same range in degrees as the scale of the clinometer.

A clinometer is shown at 110 and is provided with an arcuate scale 111. The purpose of this clinometer is to enable an observer to ascertain the degree of the rocking of the vessel. The clinometer is entirely separate from the electrical apparatus. From the rheostat 107[a] a wire 112 leads to a slide 113 of a rheostat 113[a]. This rheostat is provided with contacts 114 and with a winding 115, and from the former a wire 116 leads to the field winding 20 of the motor. A wire 117 connects this field winding with the main 24.

The gun is mounted in a turret 118 provided with an annular rack 119, and disposed internally of this rack is a driving pinion 120 which meshes with it, this pinion being mounted upon a shaft 121 whereby it may be rotated by hand or power. A driven gear 122 meshes with the annular rack 119 and is turned by motions of the turret. This gear is mounted upon a shaft 123. A pin 124 is mounted upon the gear 122 and a rod 125 is journaled upon a pivot 126 and is provided with a slot 127. This rod carries the slide 113 of the rheostat so that this rheostat is controlled directly by movements of the turret.

The hand lever 102 is directly under the control of the gunner who sights the gun. The rheostat 107[a] is controlled by an officer who may have nothing directly to do with the sighting of the gun, and is marked in degrees indicated by the clinometer. Neither does he move the slide 107 constantly. He sets this slide from time to time in accordance with observations made from the clinometer as to the number of degrees the ship may be rolling. The rheostat 107[a] is designed to set the system. For instance, the ship rolls 15 degrees; now it becomes the duty of the operator of rheostat 107[a] to set his rheostat 15 degrees. If, however, the ship keeps rolling 15 degrees continually he does not change his rheostat; but if the ship varies in the number of degrees which it rolls at any time, the operator changes the rheostat accordingly. When this rheostat is set for 15 degrees and the ship rolls 15 degrees the system is in perfect unison. The difference between what this rheostat 107[a] is set at and the number of degrees the ship rolls must be taken up by the rheostat 101[a] operated by the man who fires the gun.

It is plain that aside from the longitudinal motion of the gun caused by the turning of the turret and its contents, a gun tends ordinarily to have motions from a number of different causes. For instance, the rocking of the vessel from side to side might cause the muzzle of the gun to be raised and depressed, and as this rocking is variable in degree, the dipping of the gun tends likewise to vary in degree. Again the vessel may rock in a plane representing its general length, and this motion may be variable.

Then, the motion in the general direction of the length of the vessel is always slower than the rocking motion abeam of the vessel. Again, the partial turning of the turret may vary the degree of inclination of the gun, other things being equal. However, notwithstanding the fact that many forces and their compositions may play upon the gun for the purpose of destroying the gunner's aim, it is also clear that aside from the motion of turning the turret (which is controllable at will) the gun can be kept upon the target, or approximately so, if the apparatus is so arranged and handled that the motor armature turns at appropriate but variable rates of speed, and provided further that the direction of rotation shall be such as to compensate for the vertical direction of movement of the gun.

In my apparatus the various disturbing factors tending to throw the aim of the gun off the target are separately compensated for by causing them to reverse the direction of rotation of the motor when such reversal is necessary, and to vary the speed of the motor when such variation is necessary, in order to fully neutralize the undesirable motions of the vessel.

As may be seen from Fig. 1, the direction of the current through the field winding 20 never changes, but the number of amperes in the current is changed from time to time by the action of the various rheostats. The current through the armature, however, is reversed in direction accordingly as the contact member 74 (upper left-hand portion of Fig. 1) may engage the contact screw 68 or the contact screw 69, the pendulum 48 controlling this contact mechanism.

In reversing the direction of the flow of the current through the armature 21 without reversing the direction of the flow of the current through the field winding 20, the direction of rotation of the armature is reversed. Hence, the direction in which the motor armature rotates is due directly, at all times, to the condition of the pendulum 48, necessarily due to the position of the vessel relatively to the horizon. Such being the case, if the vessel rocks, the motor armature turns first in one direction and then in the opposite direction, these directions being controlled by the rocking of the vessel.

The purpose of the rheostats 95, 101ᵃ, 107ᵃ, and 113ᵃ, is to so control the current strength that the variable speed of the motor armature will just compensate the varying speed of the vessel relatively to the ideal constant position desired for the gun. The rheostat 95, being controlled by the pendulum 90, varies the current with regard to the speed of the rocking of the vessel. The rheostat 101ᵃ, operated directly by the gunner who is watching the target, is entirely arbitrary in its action, being intended to make the control of the gun more thorough and perfect. For instance, if the gunner finds, as a matter of observation, that notwithstanding all other compensating mechanism his aim is at certain intervals a little too low, he soon learns just how far to move the hand lever 102 in order to increase or diminish the motor current sufficiently to produce adequate compensation of movement, thereby retaining the gun continuously upon the target.

The rheostat 107ᵃ is operated upon a somewhat similar principle. Some officer watches the clinometer 110. By noting the degree of roll of the vessel, he can determine how to operate the rheostat 107ᵃ so as to compensate, or at least to assist in compensating for the number of degrees the gun must be elevated or depressed so as to virtually neutralize the motion of the ship. The officer endeavors to so control the rheostat 107ᵃ that the current handled by it will at all times represent the mean quantity of current necessary to give the motor proper energy.

The partial turning of the turret may vary, within proper limits, the angle of inclination swept over by the gun in its vertical movement, due to the rocking of the vessel and to similar disturbing influences. For instance, if the vessel is heaving violently abeam, and the turret be turned in such position that the gun points straight ahead, the rocking motion of the vessel would have comparatively little influence upon the sighting of the gun; whereas, other things remaining the same, if the gun be turned to a right angle so as to point away, say to the starboard, the angle of inclination covered by the vertical sweep of the gun may be considerable.

Now I have arranged the rheostat 113ᵃ and its connections in such a manner that the turret by its rotation and by its having complete control over the rheostat 113ᵃ, increases the current when the gun is pointed straight out to starboard, as compared with the condition when the gun is pointed, say dead ahead. Even if the rheostats 95, 107ᵃ, 113ᵃ, each fail to make an adequate increase or decrease in current, it is still of some benefit to the sighting gunner, and in some instances he can make the aim perfect by manipulating the hand lever 102. If, even with the aid of this lever, he is still unable to get a perfect line upon the target, he can at least bring the gun sufficiently near a proper training to enable him to "catch" the target at some interval while the sight of the gun is in transit across it, and this feat is rendered far less difficult as the firing zone of the gun is narrow, as above described, and the period of oscillation is the same as for the full roll of the ship.

In practice, the firing gunner, when unable to train the gun quite steadily upon the target, sees the target apparently moving out of line and back into line, then out of line again in the opposite direction and back into line, and by watching his opportunity the gunner may fire the gun at the proper instant to strike the target.

The operation of my device is as follows: Suppose the parts are in normal position, as indicated in Fig. 1, and that the gun is trained upon a target. Suppose, further, that the vessel rocks for a moment in a clockwise direction, according to Fig. 1. The contact screw 69 is thus brought into engagement with the contact arm 74 and the following circuit is complete: battery 84, wire 85, wire 86, solenoid 29, wire 87, binding post 73, box 65, contact screw 69, contact arm 74, wire 89, back to battery 84. This energizes the solenoid 29 and causes it to lift its core 29ᵃ, thereby lifting the contact plate 43 out of engagement with the contact points 36, 37, and into engagement with the contact points 34, 35. The following circuit is thus completed: main 25, wire 27, wire 44, contact point 32, contact plate 42, contact point 33, wire 38, armature 21, wire 41, resistance 40, wire 39, contact point 37, wire 47, contact point 35, plate 43 (now raised) contact point 34, wire 26, to main 24. This energizes the armature 21 of the motor and causes it to turn in the direction necessary to turn the gun 10 in a contraclockwise direction according to Fig. 1.

The winding 20 of the motor field 19 is at times energized by a circuit as follows: main 25, wire 99, rheostat 95, wire 100, rheostat 101ᵃ, wire 106, rheostat 107ᵃ, wire 112, rheostat 113ᵃ, wire 116, motor winding 20, and wire 117 to main 24. The current just traced has a constant direction, but is variable in amperage by the action of the various rheostats, as above described. The motion from the motor to the gun is transmitted from the armature shaft 22 through the coupling 17, shaft 16, bevel gears 15, 14, shaft 13 and worm 12, to sector 11, and thence directly to the gun. Suppose, now, that the ship finishes its roll in a clockwise direction, and reversing its motion turns for the moment, in a contraclockwise direction. Under the action of the pendulum 48 the contact screw 68 is caused to engage the contact arm 74 so that the following circuit is completed: battery 84, wire 85, wire 86, solenoid 28, wire 88, binding post 72, box 84, contact screw 68, contact arm 74, wire 89, back to battery 84. This raises the solenoid core 28ᵃ, so that the plate 42 disengages contact points 32, 33 and engages contact points 30, 31. The following circuit is thus completed: main 25, wire 27, contact 36, contact plate 43, contact point 37, wire 39, resistance 40, wire 41, collector 23, armature 21, wire 38, contact point 33, wire 46, contact point 31, plate 42 (now raised) contact point 30, wire 45, contact point 34, wire 26, to main 24. This energizes the armature 21, but the current flows through it in a direction opposite to that in which it is above traced in the other circuit through it. Hence, the armature 21, now operates the gearing so that the gun 10 is, relatively to the vessel, turned in a clockwise direction, as indicated by dotted lines in Fig. 1.

From the above description it will be seen that I have through the armature a reversible current of constant strength, and through the field a current of constant direction but variable strength, and that the strength of the field current is controlled by a number of factors more or less independent yet all relating, in some way, to the necessity for moving the gun in a particular direction in order to compensate for an undesirable motion of the vessel. My purpose is to deliver to the gun the exact number of watt hours necessary to neutralize the disturbing effect of the undesirable motion of the ship.

While I prefer herein to show pendulums for enabling the motions of the vessel to manipulate certain parts, I do not limit myself thereby, as any inertia-held member, known as an equivalent for the pendulum may be employed as a substitute therefor. Neither do I limit myself to the use of solenoids in the relations indicated in the lower left-hand corner of Fig. 4, as any other electrically-operated device may be employed in connection with that part of the contact mechanism.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense. It is also to be understood that the language used in the following claims is intended to cover all of the generic and specific features of the invention herein described and all statements of the scope of the invention, which as a matter of language, might be said to fall therebetween.

Having thus described my invention, I claim as new and desire to secure by Letters Patent:

1. The combination of an ordnance member to be trained, a prime mover for shifting the position of said ordnance member, a source of energy for said prime mover, an inertia-held member for varying the supply of energy from said source to said prime mover, and means controllable at will for still further varying said supply of energy.

2. The combination of an ordnance member to be trained, a prime mover for shifting the position of said ordnance member, an inertia-held member, means controllable by said inertia-held member for reversing said prime mover so as to shift said ordnance member in different directions, a second inertia-held member, and means controllable thereby for varying the supply of energy to said prime mover.

3. The combination of an ordnance member, a prime mover for shifting the position thereof, said prime mover being reversible, means controllable by the undesirable motions of a vessel for reversing said prime mover, and mechanism controllable by motions of said vessel for varying the energy supplied to said prime mover.

4. The combination of an ordnance member, a prime mover for shifting the position thereof, said prime mover being reversible, means controllable automatically by the undesirable motions of a ship for reversing said prime mover, mechanism controllable at will for varying the quantity of energy supplied to said prime mover, and mechanism acting conjointly with said last-mentioned means and controllable by motions of a vessel for still further varying said supply of energy.

5. The combination of an ordnance member, a prime mover for shifting the position thereof, said prime mover being reversible, means for reversing said prime mover so as to move said ordnance member in different directions, and mechanism controllable automatically by motions of a vessel for varying gradually the quantity of energy supplied to said prime mover.

6. The combination of an ordnance member to be trained, an electric motor for shifting the position of said ordnance member, a source of electricity for said electric motor, an inertia-held member, mechanism controllable by said inertia-held member for regulating the current of electricity supplied to said motor, a clinometer, and a rheostat disposed adjacent to said clinometer and operated by hand in accordance with indications made by said clinometer for the purpose of further qualifying the current supplied to said electric motor.

7. The combination of a member to be trained, means for moving said member, means for reversing the direction of movement thereof, and means controlled by undesirable movements of the support of said member for automatically varying the effect of said first means upon said member to compensate for movements of variable velocity of said support.

8. The combination of a member to be trained, a support therefor subject to undesirable movements, means for moving said member, means for reversing the movement thereof and means interposed between said member and the support for automatically varying the effect of said first means upon said member to compensate for movements of variable velocity of said support.

9. The combination of a member to be trained, a support for said member subject to undesirable movements, means for moving said member in a direction opposite to that of the support, means for reversing the direction of movement thereof, and means for automatically varying the effect of said first means upon said member to compensate for movements of variable velocity of said support.

10. The combination of a member to be trained on shipboard, means for moving said member, means for reversing the direction of movement of said member, and means for automatically varying the effect of said means upon said member to compensate for movements of the vessel of variable velocity.

11. The combination of a member to be trained mounted upon a support subject to undesirable movements, means for moving said member and for reversing the movement thereof simultaneously with the reversal of the direction of movement of said support, and means for maintaining the member in trained position despite the undesirable movements of the support, said means being actuated by said undesirable movements.

12. The combination of a member to be trained mounted upon a support subject to undesirable movements, means for moving said member and for reversing the movement thereof simultaneously with the reversal of movement of said support, and means for automatically varying the effect of said means upon said member.

13. The combination of a member to be trained mounted upon a floating support which is subject to undesirable movements, means for moving said member and for reversing the movement thereof simultaneously with the reversal of movement of said support, and means the operation of which is caused by the undesirable movement of said support for varying the effect of said means upon said member to compensate for movements of said support of variable velocities.

14. The combination of an ordnance member to be trained upon shipboard, means for shifting the position thereof and for reversing its movements simultaneously with the reversal of the undesirable movements of the vessel, and means controllable by said undesirable movements for varying the effect of said means upon said member.

15. The combination of an ordnance member, a prime mover for shifting the position thereof, said prime mover being reversible, means controllable by the undesirable motions of the vessel for reversing said prime mover, and means controllable by motions of the vessel other than its motions of travel for varying the effect of the prime mover upon said member.

16. The combination of a member to be trained, a support for said member subject to undesirable movements, means interposed between said support and said member for shifting the latter simultaneously with the occurrence of undesirable movements of the support, and inertia controlled means for varying the effect of said means upon said member, controllable by said undesirable movements.

17. The combination of an ordnance member to be trained upon shipboard, a motor for shifting the position of said ordnance member, means for reversing the direction of movement of said ordnance member simultaneously with the reversal of the movement of the vessel, and an inertia-held means for varying the effect of the motor upon said member to compensate for movements of the vessel of variable velocity.

18. The combination of an ordnance member, reversible mechanism for shifting the position thereof, means for reversing the movement of said ordnance member, and inertia means controllable automatically by motions of the vessel other than its motions of travel for varying the effect of said mechanism upon said member to compensate for movements of the support of variable velocity.

19. The combination of an instrument to be trained, means for changing the position thereof relative to a vessel upon which the same is mounted, inertia controlled means for reversing the direction of movement of said member simultaneously with the reversal of movement of the vessel, and means controlled by the undesirable movements of the vessel for maintaining said member in trained position.

20. The combination of a member to be trained upon shipboard, means for moving said member in a direction opposite to the undesirable motion of the vessel, means for reversing the direction of movement of said member, and mechanism for varying the movement of said member whereby the same is moved in consonance with the movement of the vessel, said last mentioned means being actuated by the undesirable movements of the vessel.

21. The combination of an instrument to be trained upon shipboard, means for shifting said member, means for reversing the movement thereof concomitantly with the reversal of the movements of the vessel other than its movement of travel, and mechanism controlled by the movements of the vessel for varying the movement of said instrument to compensate for movements of the vessel of variable velocity, whereby the same is moved in consonance with the movement of the vessel.

22. The combination of a member to be trained upon shipboard, means controlled by the undesirable motions of the vessel for shifting said member, and means regulated by the speed of said undesirable movements for varying the effect of said first mentioned means upon said member.

23. The combination of a member to be trained, a support for said member subject to undesirable movements, means for moving said member in a direction opposite to that of said support, and means controlled by said undesirable movements for automatically varying the effect of said first mentioned means upon said member in accordance with the velocity of the undesirable movements of the support, whereby said member tends to remain in trained position despite the undesirable movements of said support.

24. The combination of a member to be trained upon shipboard, means controllable by undesirable movements of the vessel for shifting said member and for reversing the same, means controlled by the undesirable movements of the vessel for varying the effect of said means upon said member, and adjustable means for still further varying the effect of said last mentioned means upon said member to compensate for undesirable movements of the vessel of varying angular magnitudes.

25. The combination of a member to be trained upon shipboard, means for shifting said member, means for reversing its movements, inertia means controllable by the undesirable movements of the vessel for modifying the effect of said means upon said member, and means for still further varying the effect of said means upon said member whereby said member may be moved in accordance with the speed of the undesirable movements of the vessel.

26. The combination of a member to be trained upon shipboard, a prime mover for shifting the position of said member, means for reversing the movement of said member, inertia means for varying the effect of the prime mover on said member controllable by the undesirable movements of the vessel, and means for still further varying the effect of the prime mover upon said member whereby the same will be caused to move in consonance with the undesirable movements of the vessel of predetermined velocity.

27. The combination of an ordnance member adapted to be trained upon shipboard, a prime mover for shifting the position thereof, said prime mover being reversible, means controllable automatically by the undesirable movements of the vessel for reversing said prime mover, means controllable automatically by said undesirable movements for varying the effect of said prime mover upon said member, means for still further varying the effect of the prime mover upon said member to compensate for undesirable movements of the vessel of different angular magnitudes, and means for adjusting said last mentioned means.

28. The combination of an ordnance member to be trained upon shipboard, a motor for shifting the same, means controllable by the undesirable movements of the vessel for reversing said motor, and means controllable by the undesirable movements of the vessel for varying the effect of the motor upon said member.

29. The combination of an ordnance member to be trained upon shipboard, of a motor for shifting the position of the same, inertia means controllable automatically by the undesirable motions of the vessel for reversing said motor concomitantly with the reversal of the undesirable movements of the vessel, and means coöperating with said motor to effect a movement of the ordnance member that will be in consonance with the movement of the vessel.

30. The combination of an ordnance member to be trained upon shipboard, a motor for moving the same, means controllable by the undesirable movements of the vessel for reversing the motor, means controllable by the undesirable movements of the vessel for varying the supply of energy to the motor.

31. The combination of an ordnance member adapted to be trained upon shipboard, a motor for shifting the position of said member, means controllable by the undesirable motions of the vessel for reversing said motor, means controllable by the undesirable motions of the vessel for varying the energy supply to said motor, and means for further varying said supply of energy whereby said ordnance member may be caused to move in consonance with the movements of the vessel of varying angular magnitudes.

32. The combination of an ordnance member to be trained upon shipboard, means for shifting said member, means for reversing the movement thereof concomitantly with the reversal of the direction of movement of the vessel, and means controlled by the movements of the vessel for thereafter causing said member to move at a speed commensurate with the speed of movement of the vessel, whereby said ordnance member always tends to remain in trained position.

33. The combination of an ordnance member to be trained upon shipboard, means for reversing the movement of said member concomitantly with the reversal of the direction of an undesirable movement of the vessel, and means for thereafter automatically moving said member at such speed as will compensate for any undesirable movement of the vessel that would tend to untrain the member.

34. The combination of an ordnance member to be trained upon shipboard, means for shifting the same simultaneously with the occurrence of undesirable movements of the vessel, means for reversing the movement of said member concomitantly with the reversal of movement of the vessel, and automatic operating means for thereafter causing such relative, compensatory motion to take place between the support and said member as will maintain the latter in trained position.

In testimony whereof, I affix my signature in the presence of two witnesses.

JAMES BOLAND RYAN.

Witnesses:
WM. SAQUI,
ADELE HONIGSBERG.